United States Patent [19]
Eisenlohr et al.

[11] 3,933,979

[45] Jan. 20, 1976

[54] GAS PURIFYING METHOD

[75] Inventors: Karl-Heinz Eisenlohr, Buchschlag;
Berthold Scholz, Weisskirchen;
Ernest Kapp, Frankfurt am Main,
all of Germany

[73] Assignee: Metallgesellschaft Aktiengesellschaft,
Frankfurt am Main, Germany

[22] Filed: Aug. 23, 1973

[21] Appl. No.: 390,826

[30] Foreign Application Priority Data

Sept. 22, 1972 Germany............................ 2246722

[52] U.S. Cl................................ 423/239; 423/245
[51] Int. Cl.²......................................... B01D 53/34
[58] Field of Search ........... 423/210, 230, 239, 244, 423/245, , 247

[56] References Cited
UNITED STATES PATENTS

| | | | |
|---|---|---|---|
| 1,919,842 | 7/1933 | Jean et al............................ | 423/239 |
| 3,084,023 | 4/1963 | Anderson et al. .................. | 423/239 |

FOREIGN PATENTS OR APPLICATIONS

| | | | |
|---|---|---|---|
| 714,483 | 7/1965 | Canada.............................. | 423/245 |
| 384,532 | 12/1932 | United Kingdom................. | 423/239 |
| 561,679 | 5/1944 | United Kingdom................. | 423/230 |
| 563,350 | 8/1944 | United Kingdom................. | 423/230 |
| 953,216 | 3/1964 | United Kingdom................. | 423/245 |
| 789,465 | 7/1968 | Canada.............................. | 423/245 |

*Primary Examiner*—Earl C. Thomas
*Attorney, Agent, or Firm*—Burgess, Dinklage & Sprung

[57] ABSTRACT

Hydrogen containing gases are purified to remove components therein having polymerization, resinification or coking tendencies or to transform such compounds into harmless compounds. The sulfur content of the hydrogen containing gas is adjusted by adding sulfur or sulfur compounds such that the sulfur content is at least 0.05 to 8 g/Nm³. The adjusted gas is then passed through a hydrogenation catalyst at temperatures between 100° and 400°C. Suitable hydrogenation catalysts are one or more sulfides and/or oxides of metals of the 6th and 8th Group of the periodic system.

8 Claims, No Drawings

GAS PURIFYING METHOD

BACKGROUND

The invention relates to a method for purifying gases containing hydrogen and in particular to removing components in such gases having polymerization, resinification or coking tendencies or transforming such components to harmless compounds.

In the handling or processing of gases which contain substances having a tendency to polymerize, resinify or coke, deposits are formed which lead to the clogging of pipes, apparatus, tubes and other parts of the equipment. These deposits are polymers or resin or coke-like substances which form from the reactive compounds of mostly low molecular weight which are present in the gas.

It is known that reactive compounds present, for example, in coke oven gas, which results in sedimentation and clogging due to the formation of polymers, can be removed by first compressing the coke oven gas to about 10 to 20 atmospheres, then passing it at elevated temperature over hydrogenation catalysts, and further compressing the gas thus treated to higher pressures. (Ger. Pat. No. 1,007,466).

German Pat. No. 1,047,354 furthermore discloses a process for the refinement of hydrocarbons by catalytic hydrogenation in which the hydrocarbons present in the gaseous or liquid phase at elevated temperature and at elevated pressure are refined by hydrogenation in the presence of illuminating gas, coking as and gas from low-temperature carbonization, i.e., gases containing hydrogen, on sulfur-proof catalysts, the loading of the catalyst through which the hydrogen-containing gases are fed before being delivered to the hydrogenation refinement being from substantially more than 1000 $Nm^3$ to about 5000 $Nm^3$ and more of gas per $m^3$ of catalyst per hour.

These known methods of the prior art, however, are suitable only for the hydrogenation refinement of hydrocarbons and therefore they are of limited usefulness. Usually a high pressure is required for the performance of the process, along with other exacting requirements, so that these processes are difficult and necessitate close supervision.

SUMMARY

The invention is addressed to the problem of freeing hydrogen containing gases of all kinds from components having a tendency towards polymerization, resinification and coking or transforming such components to harmless compounds. The process is simple and economical, requires no complicated apparatus, and is practicable at normal pressure or slight overpressure.

This problem is solved in accordance with the invention by adjusting the sulfur content of the gas by adding sulfur or sulfur compounds to a sulfur content of at least 0.05 to 8.00 $g/Nm^3$ or higher, preferably to 0.2 to 5.0 $g/Nm^3$, of actual sulfur, and then passing it through hydrogenating catalysts at temperatures between 100° and 400°C preferably 150° and 300°C.

Preferably, hydrogen sulfide is added as the sulfur compound within the scope of the invention, and/or salts of hydrogen sulfide which are transformed on the catalyst to $H_2S$ at the prevailing temperatures.

Carbon disulfide may also be added in addition to hydrogen sulfide or its salts.

DESCRIPTION

It is just as well possible, however, to add gases or liquids containing these substances to the gas being refined, so that otherwise worthless gases may thus be recycled.

If sufficient sulfur, hydrogen sulfide or other suitable sulfur compounds are present in the gas to be purified, they do not have to be added.

According to a further development of the invention, steam is additionally added when gases rich in carbon monoxide are purified. By this measure undesirable side reactions such as methanization reactions, for example, with the high positive heat tones which they produce, are substantially suppressed in the gas being purified.

This addition of steam may be dispensed with if a sufficient amount of water vapor is already contained in the gas being cleaned. It has been found that, depending on the CO content of the gas, a quantity of steam of up to 600 $g/Nm^3$ is sufficient for this purpose. The addition of steam is recommended especially in the case of gases containing 10 percent and more CO by volume and having temperatures higher than about 200°C.

According to a further development of the invention one uses as hydrogenation catalysts compounds consisting of sulfides and/or oxides of metals of the 6th and 8th Group of the periodic system, such as for example tungsten, molybdenun, chromium, iron, nickel, cobalt or the like, or of mixtures of two or more of these oxides and/or sulfides. These catalysts can additionally contain other conventional components such as activators, e.g., zinc oxides (e.g., aluminum oxide), bleaching earth or the like.

The invention will be further described with the aid of the following examples.

EXAMPLE 1

An impure coke oven gas had the following composition:

| | | | |
|---|---|---|---|
| Approx. | 2.8 | vol-% | $CO_2$ |
| " | 0.5 | vol-% | $C_nH_m$ |
| " | 0.6 | vol-% | $O_2$ |
| " | 6.0 | vol-% | CO |
| " | 55.0 | vol-% | $H_2$ |
| " | 20.0 | vol-% | $CH_4$ |

Remainder $N_2$
Additionally, the gas contained:
Approx.  4 g $H_2S/Nm^3$
"  5 mg $NO/Nm^3$ and
"  2 g unsaturated hydrocarbons per $Nm^3$.

The gas was compressed in the first stage of a four-stage piston-type compressor to 2.5 atmospheres gauge pressure, emerged from the compression stage at about 120°C, flowed through an oil separator, and then was warmed in a preheater to a temperature of about 180°C. Then the gas was passed at the rate of about 3500 $Nm^3$ hour per cubic meter of catalyst through a reaction chamber filled with catalyst, then cooled in a heat exchanger followed by a water cooler to about 30°C, and finally was delivered to the second compression stage.

The catalyst used in this and subsequent examples was as follows:

| | | |
|---|---|---|
| $MoO_3$ | 13.5% | |
| CoO | 5.0% | |
| $Al_2O_3$ | 81.5% | (as carrier) |
| total | 100% | |

The catalyst has a inner surface, measured by the BET-method, of 220 m²/g; the average volume of the porous amounts of 0.5 cm³/g. The catalyst is known under the trade name BASF-Katalysator M 8–10 (Kobalt-Molybdan-Katalysator 0852).

By the catalytic treatment of the gas in accordance with the invention the content of unsaturated hydrocarbons was diminished to 0.1 g/Nm³. Furthermore the original oxygen content was diminished from 0.6 volpercent to less than 0.1 vol-percent. The nitrogen oxide content was reduced to small traces. No polymers or resin deposits occured any longer in the compression stages that followed.

EXAMPLE 2

For this example, a coke oven gas purified by ordinary Lux compound and having the following composition is used:

| Approx. | 3 | vol-% | $CO_2$ |
|---|---|---|---|
| " | 0.5 | vol-% | $C_nH_m$ |
| " | 0.5 | vol-% | $O_2$ |
| " | 7 | vol-% | CO |
| " | 56 | vol-% | $H_2$ |
| " | 21 | vol-% | $CH_4$ |

Remainder nitrogen.
Additionally, the gas contains:

| | 0.02 | g/Nm³, $H_2S$ |
|---|---|---|
| Approx. | 2 | ppm NO |
| " | 3 | g/Nm³ aromatics, mainly benzene |
| " | 2 | g/Nm³ olefins and diolefins. |

The gas comes from a long-distance gas pipeline and is available under a pressure of about 50 atmospheres. The $H_2S$ content of 0.02 g/Nm³ present in the case is not sufficient for the removal of the unsaturated compounds. In accordance with the invention, therefore, sulfur or sulfur compounds are added to make up the required sulfur content.

For this purpose, for every 600 Nm³/h of gas and 200 l of catalyst, 200 g of liquid sulfur is fed hourly into the gas, so that a total sulfur content of 0.35 g/Nm³ results. Then the gas is heated with steam to 210°C and it is passed through the catalyst of Example 1, at the rate of 3000 Nm³ of gas per hour for each cubic meter of catalyst. The gas thus purified is then delivered to a hydrogenation reactor for the hydrogenation of hydrocarbons and there it is mixed with the reaction gas. Whereas, formerly, when the coke oven gas was mixed with the reaction gas, polymerizates formed which led to a strong yellow coloring of the raffinate, these undersired discolorations are now entirely eliminated. Furthermore, deposits which previously formed in the mixing zone are reduced to an insignificant amount.

The same results are achieved when, instead of the continuous feed of sulfur, 1500 g of sulfur is added at intervals of 3 days.

EXAMPLE 3

Example 2 is repeated, using the same original gas, under the same conditions, the operational data being identical. However, instead of elementary sulfur, hydrogen sulfide is proportioned into the gas current. This hydrogen sulfide enters the gas not alone but as a component of an $H_2S$-containing residual gas from a hydrogenating installation. For this purpose 20 Nm³ per hour is delivered into the gas being purified. The hydrogenation residual gas has the following composition:

| Approx. | 2.5 | vol-% | $CO_2$ |
|---|---|---|---|
| " | 0.8 | vol-% | $C_nH_m$ |
| " | 0.0 | vol-% | $O_2$ |
| " | 3.6 | vol-% | CO |
| " | 40 | vol-% | $H_2$ |
| " | 35 | vol-% | $CH_4$ |

Remainder nitrogen.
$H_2S$ content: 10 g/Nm³.

The addition of the hydrogenation residual gas resuslts in a sulfur content of approximately 0.32 g/Nm³.

EXAMPLE 4

An unpurified gas from the pressure gasification of coal is to be subjected to carbon monoxide conversion. Its composition is as follows:

| Approx. | 29 | vol-% | $CO_2$ |
|---|---|---|---|
| " | 0.4 | vol-% | $C_nH_m$ |
| " | 19 | vol-% | CO |
| " | 39 | vol-% | $H_2$ |
| " | 11.5 | vol-% | $CH_4$ |

Also, the gas contains approximately 4.5 g $H_2S$/Nm³. The gas contains 500 g of steam per Nm³, plus vapors of tar, oils and light hydrocarbons. After the separation of droplets and heating the gases to 220°C, the gas is passed through a reaction vessel filled with catalyst as in Examples 1 to 3, in order then to be raised by heat exchangers or heaters to the temperature required for this conversion. The catalyst loading amounts to 1000 Nm³ of gas per m³ of catalyst. When the gas passes through the catalyst at a pressure of about 20 atmospheres and a temperature of 220°C, all of the substances contained in the gas which tend to polymerize are decomposed to a very great degree. The original content of olefins, diolefins and other polymerizable components of about 10 grams per Nm³ of gas is reduced by the catalytic treatment of the gas in accordance with the invention to a content of less than 1 g per Nm ³. Reducing the polymerizable substances to one-tenth of the original content would suffice to assure two years of operation. The fouling that formerly occurred in heat exchangers, pipelines and in the conversion catalyst is greatly diminished.

The advantages achieved with the invention consist especially in the fact that it is possible in a simple and economical manner to free gases of all kind, which contain hydrogen, of unsaturated compounds tending to polymerize or resinify, or to transform these compounds into harmless substances.

The process is distinguished by its simplicity and ease of supervision. In most applications no special apparatus are required for heating and cooling the gas, because the reaction chamber containing the catalyst can be installed or arranged within the process at any place where proper temperatures exist for the performance of the catalytic purification.

The process of the invention has the additional advantage that the fouling of the catalyst by reaction products is extremely slight, so that only at time intervals of several years does it need to be replaced or regenerated.

Since the catalytic reaction takes place with positive heat tone, the purified gas is warmed to about 60°C, which is most cases, is useful for the further processing of the purified gas, because it permits the saving of appreciable amounts of energy.

We claim:

1. A method for purifying hydrogen-containing gases which also contain nitrogen oxides to remove the nitrogen oxides from such gas which comprises adjusting the sulfur content of the hydrogen containing gas to 0.05 to 8 g/Nm$^3$ or more by adding sulfur or sulfur compounds thereto and passing this adjusted gas over a hydrogenation catalyst at a temperature between 100° and 400°C.

2. Method of claim 1 wherein hydrogen sulfide and/or salts of hydrogen sulfide are added as sulfur compounds.

3. Method of claim 1 wherein carbon disulfide is added as the sulfur compound.

4. Method of claim 1 wherein the sulfur compounds are added in the form of gases or liquids containing such compounds.

5. Method of claim 1 wherein water vapor is additionally added when CO-rich gases are cleaned.

6. Method of claim 1 wherein the hydrogenating catalysts are selected from the group consisting of one or more sulfides and/or oxides of metals of the 6th and 8th Group of the Periodic System.

7. A process according to claim 1 wherein said hydrogenation catalyst is a $MoO_3$-$CoO$-$Al_2O_3$ catalyst.

8. A process according to claim 1 wherein said hydrogen-containing gas stream also contains an olefin.

* * * * *

UNITED STATES PATENT AND TRADEMARK OFFICE
CERTIFICATE OF CORRECTION

PATENT NO. : 3,933,979
DATED : January 20, 1976
INVENTOR(S) : Karl-Heinz Eisenlohr et al It is certified that error appears in the above-identified patent and that said Letters Patent are hereby corrected as shown below:

Column 2, line 19

"cleaned" should be "purified".

Signed and Sealed this

Twenty-seventh Day of July 1976

[SEAL]

*Attest:*

RUTH C. MASON
*Attesting Officer*

C. MARSHALL DANN
*Commissioner of Patents and Trademarks*